(12) United States Patent
Goodall et al.

(10) Patent No.: US 9,519,712 B2
(45) Date of Patent: Dec. 13, 2016

(54) SYSTEMS AND METHODS TO EVALUATE SEARCH QUALITIES

(75) Inventors: Colin R. Goodall, Rumson, NJ (US); Sylvia Halasz, Fair Haven, NJ (US); Wen-Ling Hsu, Bridgewater, NJ (US); Guy Joseph Jacobson, Bridgewater, NJ (US); Ritu Kumar, Edison, NJ (US); Bradley Keith Mohs, South Pasadena, CA (US); Ann E. Skudlark, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 771 days.

(21) Appl. No.: 12/349,491

(22) Filed: Jan. 6, 2009

(65) Prior Publication Data

US 2010/0174736 A1 Jul. 8, 2010

(51) Int. Cl.
*G06F 7/00* (2006.01)
*G06F 17/30* (2006.01)

(52) U.S. Cl.
CPC .............. *G06F 17/30864* (2013.01)

(58) Field of Classification Search
CPC ............... G06F 17/30864; G06F 17/30; G06F 17/30861; Y10S 707/99933
USPC ........ 707/714, 765, 607, 722–723, 706–708, 707/770–771; 705/7.38–7.39; 718/101
See application file for complete search history.

(56) References Cited

U.S. PATENT DOCUMENTS

| | | | |
|---|---|---|---|
| 5,692,181 A * | 11/1997 | Anand et al. ................. 707/714 |
| 5,933,822 A * | 8/1999 | Braden-Harder et al. | |
| 6,289,334 B1 * | 9/2001 | Reiner et al. | |
| 6,418,432 B1 * | 7/2002 | Cohen et al. | |
| 6,490,579 B1 * | 12/2002 | Gao et al. ...................... 707/707 |
| 6,871,226 B1 * | 3/2005 | Ensley et al. ................. 709/224 |
| 6,901,399 B1 * | 5/2005 | Corston et al. | |
| 7,289,964 B1 * | 10/2007 | Bowman-Amuah .......... 705/1.1 |
| 7,340,454 B2 * | 3/2008 | Wu .................... G06F 17/30864 707/711 |
| 7,765,178 B1 * | 7/2010 | Roizen .............. G06F 17/30687 |
| 7,778,998 B2 * | 8/2010 | Gupta .......................... 707/714 |
| 8,201,107 B2 * | 6/2012 | Chevalier ........... G06F 17/3089 707/706 |
| 8,676,273 B1 * | 3/2014 | Fujisaki ......................... 455/567 |
| 2002/0147880 A1 * | 10/2002 | Wang Baldonado ............. 711/1 |
| 2004/0236739 A1 * | 11/2004 | Nevill-Manning ................ 707/5 |
| 2005/0002510 A1 * | 1/2005 | Elsey et al. .............. 379/201.01 |
| 2005/0015466 A1 * | 1/2005 | Tripp ............................. 709/219 |
| 2005/0154716 A1 * | 7/2005 | Watson et al. .................... 707/3 |
| 2005/0165753 A1 * | 7/2005 | Chen ................. G06F 17/30867 |
| 2006/0173830 A1 * | 8/2006 | Smyth et al. ...................... 707/3 |
| 2006/0184996 A1 * | 8/2006 | Condon ............................ 726/2 |

(Continued)

*Primary Examiner* — Alex Gofman
*Assistant Examiner* — Linh Black
(74) *Attorney, Agent, or Firm* — Hartman & Citrin LLC

(57) ABSTRACT

Systems and methods are provided to evaluate a search engine using search results retrieved from a plurality of different search engines. For example, a controller can randomly distribute a set of pre-formulated queries to a plurality of computers to query the search engines at random times to obtain search results and combine the search results to evaluate the completeness of a query result provided by a particular search engine. The controller may simulate the random queries from users using a set of computers and may reduce the burden on the search engines by spreading out the query activities over a period of time, such as a month.

19 Claims, 8 Drawing Sheets

(56) References Cited

U.S. PATENT DOCUMENTS

| | | | |
|---|---|---|---|
| 2007/0130112 A1* | 6/2007 | Lin ................................... | 707/2 |
| 2007/0265999 A1* | 11/2007 | Amitay et al. ..................... | 707/2 |
| 2008/0027913 A1* | 1/2008 | Chang et al. ...................... | 707/3 |
| 2008/0052278 A1* | 2/2008 | Zlotin et al. ....................... | 707/3 |
| 2008/0077570 A1* | 3/2008 | Tang et al. ........................ | 707/5 |
| 2008/0126054 A1* | 5/2008 | Cohen ................... | G06Q 10/08 703/13 |
| 2008/0222140 A1* | 9/2008 | Lagad et al. ...................... | 707/5 |
| 2008/0270366 A1* | 10/2008 | Frank ................................ | 707/3 |
| 2008/0301120 A1* | 12/2008 | Zhu et al. ......................... | 707/5 |
| 2009/0070306 A1* | 3/2009 | Stroe et al. ....................... | 707/4 |
| 2009/0097632 A1* | 4/2009 | Carnazza et al. ......... | 379/211.02 |
| 2009/0216748 A1* | 8/2009 | Kravcik ............. | G06F 17/30864 |
| 2009/0276425 A1* | 11/2009 | Phillips et al. ................... | 707/6 |
| 2009/0279532 A1* | 11/2009 | Perna et al. ................. | 370/352 |
| 2009/0327224 A1* | 12/2009 | White et al. ...................... | 707/3 |
| 2010/0121841 A1* | 5/2010 | He et al. ........................ | 707/722 |

\* cited by examiner

SYSTEMS AND METHODS TO EVALUATE SEARCH QUALITIES

FIELD OF THE TECHNOLOGY

At least some embodiments of the disclosure relate to search engines in general and, more particularly but not limited to, performance evaluation of search engines.

BACKGROUND

Search engines provide a convenient way to access information. However, when a user submits the same search request to different search engines, the user may get different search results, due to the different sets of information collected and indexed by different search engines and/or due to the different ways the search engines are configured to identify search results.

Search engines may use software tools to visit various web servers automatically to identify information existing on the web and index the information for subsequent searches. For example, a search engine may crawl the web to retrieve web page content to then index web content to power user searches. A search engine may also maintain a cached copy of web pages to serve when the original site is not available.

Search engines may also obtain content or data from other sources, such as data submitted directly to the search engines, such as business listings, advertisements, airline flight directories of schedules and fares, etc. These search engines are typically specialized, to local search, as a merchant site, or to travel.

Web scraping generally includes activities to extract data or content from a website through manual or automated processes. The extracted data may be used in various ways, including indexing the website to facilitate searching, using the extracted data to run a separate website, or to power a separate application, etc. For example, travel fares available on the websites of individual airlines may be available on other websites that aggregate travel websites.

Generally, a website expects and welcomes visits by automated tools, including web crawlers, as well by individual non-automated users. The web depends on this activity to make a set of web sites into a network of discoverable sites. Further, both businesses and individuals, as part of usual competitive information gathering, will visit a number of other websites to help inform an understanding of the differences in customer experience.

Not welcome, however, is excessive numbers of robotic-powered requests, or systematic activities to extract all or almost all of the content of the web site, which may be the business or personal property of the web site owner, especially when that activity is for direct financial gain. For example, a scraper may use the extracted data to set up a scraper site, which serves its users using the data extracted through web scraping without referring the users to the original website. Also, web scraping may overload a website, causing degradation in response performance for regular users of the website.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to evaluate the performance and quality of a search engine. In one embodiment, a controller obtains search results from different search engines and filters and combines the search results to generate a master set of search results for each query. For example, the controller may use a plurality of computers to randomly submit a set of pre-formulated queries to a plurality of different search engines. The controller obtains the search results from the different search engines and combines the search results to generate a master set of unique, valid search results for each query. The controller then compares the search results from a search engine with the master set of unique, valid search results to determine an indicator of completeness and/or a relevancy metric of the search results of a particular search engine.

In one embodiment, to reduce the impact on the workload of the search engines, the controller randomly uses the computers to submit the queries at random times over an extended period of time, with random pauses between queries. Since the controller spreads the queries over a long period of time, the rate of the queries initiated by the controller becomes negligible in comparison with the normal usage of the search engines.

Figure 1:
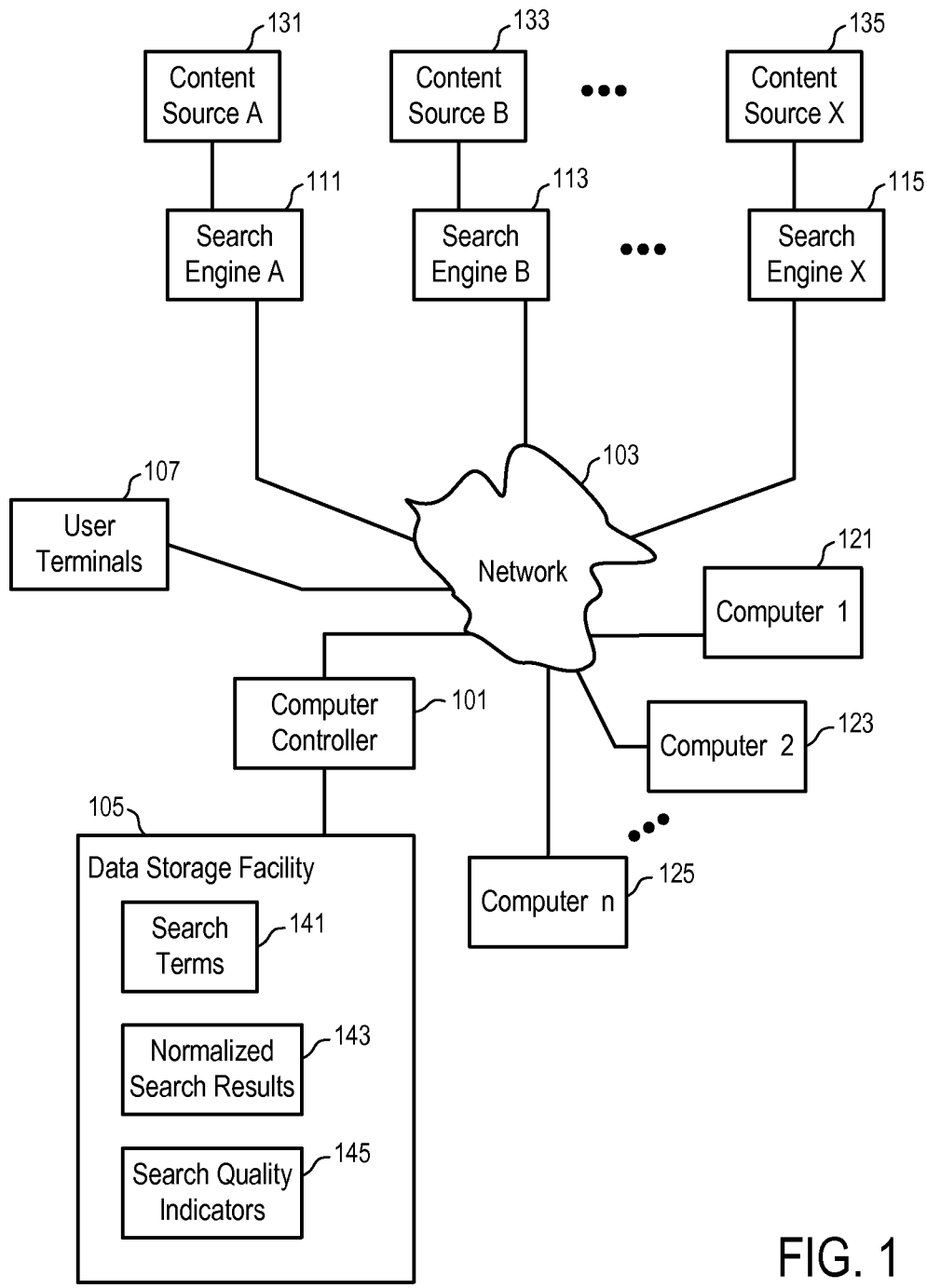
FIG. 1 shows a system to evaluate the performance of a search engine according to one embodiment.

FIG. 1 shows a system to evaluate the performance of a search engine according to one embodiment. In FIG. 1, a plurality of search engines (111, 113, . . . , 115) provide services to general users, such as users of user terminals (107) connected to a network (103).

The network (103) may include a local area network, a wireless data communication network, a telephone network, a cellular communication network, a telecommunication network, an interactive television network, a packet network, an Internet Protocol Television (IPTV) network, an intranet, or a combination of networks, such as Internet.

In one embodiment, some of the search engines (e.g., 111, 113, . . . , or 115) may block access from a user terminal (e.g., 107) if the requests from the user terminal (e.g., 107) consume excessive resources of the search engine (e.g., 111, 113, . . . , or 115), such as when the user terminal (e.g., 107) submits an excessive number of search requests within a period of time, or submits search requests at a rate higher than a threshold, etc. In one embodiment, the user terminal (107) is a data processing system, such as a notebook computer, a personal computer, a workstation, a network computer, a personal digital assistant (PDA), a mobile phone, a cellular phone, microprocessor-based or programmable consumer electronics, and the like.

In FIG. 1, a computer controller (101) controls the use of a set of computers (121, 123, . . . , 125) to query the search engines (111, 113, . . . , 115) for the evaluation of the performances, without creating a significant burden on the search engines (111, 113, . . . , 115) in comparison to the collection of normal usages by the typical users, such as those using the user terminals (107). Thus, the activities of the controller (101) for the performance evaluation would not degrade the performance of the search engines for regular users.

In some embodiments, the computers (121, 123, . . . , 125) form a cluster on a local area network. In some embodiments, the computers (121, 123, . . . , 125) are distributed over a wide area network, such as Internet. In some embodiments, the computers (121, 123, . . . , 125) have a server software program installed to form a set of peer to peer connected computation nodes, a portion of which can be dynamically allocated for a computation task; and the controller (101) may randomly assign a set of queries to a subset of nodes to query the search engines (111, 113, . . . , 115). In some embodiments, the computers (121, 123, . . . , 125) do not communicate with each other to share workload; and the controller (101) directly assigns queries to selected ones of the computers (121, 123, . . . , 125). For example, the controller (101) may execute scripts on the computers (121, 123, . . . , 125) via web services, remote procedure calls, etc. to cause the computers (121, 123, . . . , 125) to submit queries to the search engines (111, 113, . . . , 115) and/or process the corresponding search results.

In one embodiment, the controller (101) controls the timing and rate of the queries designed for the evaluation of the performance of the search engine. For example, the controller (101) may randomly select a computer (e.g., 121) from the computers (121, 123, . . . , 125) to submit a number of queries to the search engines (111, 113, . . . , 115) for the performance evaluation; the controller (101) may instruct a selected computer to submit a random number of queries and pause a random period of time between queries.

In FIG. 1, the controller (101) has access to a data storage facility (105) which stores a set of search terms (141) that define a set of pre-determined query requests for the evaluation of the search engines (111, 113, . . . , 115). The controller (101) provides the search terms to randomly selected ones of the computers (121, 123, . . . , 125) to query the search engines (111, 113, . . . , 115) and obtain search results.

In one embodiment, after the controller (101) uses the same search term to query the different search engines (111, 113, . . . , 115) via the randomly selected ones of the computers (121, 123, . . . , 125), the controller (101) normalizes and combines the search results from the different search engines (111, 113, . . . , 115) to form a set of normalized search results (143). The normalization process includes field by field transformations, for example of address and telephone numbers to respective standardized formats. The normalization allows the controller (101) to identify duplicated results from the same search engine and to identify the same or similar results from different search engines. In some embodiments, the search engines (111, 113, . . . , 115) return results in rank order; and the controller also generates the set of the normalized, standardized results as an ordered list of results.

In one embodiment, the controller (101) eliminates duplicated results from the search engines (111, 113, . . . , 115) to form a set of normalized, unique results. The controller (101) can compare the results from individual search engines (e.g., 111) to the master list of normalized results to determine an indicator of completeness for search results produced by the individual search engines (e.g., 111).

In one embodiment, the search results are business listings; and the controller (101) identifies the unique listings based on telephone numbers, business names and/or addresses. In some instances, the same listing may be assigned different telephone numbers for call tracking purposes when the listing is presented via a search engine. Calls to the telephone number provided in the listing are routed to the telephone number of the business. Thus, a different telephone number may not necessarily represent a unique, different business listing. A combination of the business name and address can be used to identify the listing, even though the telephone number listed may be different for different search results (e.g., returned by the same search engine or returned by different search engines). In some embodiments, the controller (101) normalizes addresses against a standardized database (e.g., the U.S. Postal Service (USPS) database of deliverable addresses) in order to facilitate comparison.

In some embodiments, the controller (101) also uses results from the record linkage fields in relevancy calculation. Sponsored advertisements, for example, may not be highly relevant to the search term. Thus, the controller (101) may evaluate the relevancy of the business listing to determine whether or not to include the business listing, presented as a sponsored advertisement, in overall summaries of the search engine results and in comparing sets of search engines. In some embodiments, the controller (101) uses a frequency count of matched listings to determine relevancy, where a listing that occurs in the results for multiple search engines and, optionally, near the top of the ordered set of listings has relevancy. In yet other embodiments, the relevancy of a listing is determined by an outside panel of human researchers, and the panel results are imported for use by the controller (101).

In one embodiment, the search engines (111, 113, . . . , 115) provide the search results based on different content sources (131, 133, . . . , 135). In other embodiments, some of the search engines (111, 113, . . . , 115) may share content sources (131, 133, . . . , 135) but provide different search results based on different search methods, preferences, priority schemes, etc.

For example, in one embodiment, the searches are related to the telephone numbers and/or addresses of businesses (or individual persons). For example, the search engines (111, 113, . . . , 115) and their corresponding content sources (131, 133, . . . , 135) may represent an online telephone directory of businesses and/or people. In response to a search request, a search engine (e.g., 111, 113, . . . , 115) may provide a plurality of listings of businesses and/or individuals that match the search criteria.

In one embodiment, a search engine (e.g., 111) may log the search requests from the user terminals (e.g., 107) of the end users. Periodically, an administrator (not shown in FIG. 1) of the search engine (e.g., 111) may select a set of search terms (141) from the logged search requests, such as the most popular search terms and/or least popular search terms. The controller (101) then uses the selected set of search terms (141) to evaluate the performance of the search engine (e.g., 111) over a period of time.

In one embodiment, the controller (101) also performs the logging of the search requests from the user terminals (e.g., 107) and the selecting of the search terms (141) based on a set of predetermined criteria. In another embodiment, a separate computer connected to the search engine (111) selects the search terms (141) and submits the search terms (141) to the data storage facility (105) for performance evaluation.

For example, an operator of a search engine (111) may wish to create a monthly scorecard that quantitatively and qualitatively ranks the search/data quality of the search engine (111) web site and the web sites of its major competitors. This information may indicate the effectiveness of improvements to the search engine (111) over time.

To generate the monthly scorecard, the controller (101) can use the computers (121, 123, . . . , 125) to obtain results pages that are responsive to a search term at that time. A preselected number of listings—starting at the top—in the search results may be "scraped" by the controller (101) by parsing the result pages for data fields; and the data storage facility (105) may store the data extracted from the listings for subsequent analyses to determine completeness and accuracy.

For example, a set of preselected local search requests may include a number of query terms and a number of searches by business names distributed across different locations. The controller (101) spreads the searches over a period of a month, such that the rate of searches submitted by the controller (101) is less than a few searches per minute and thus represents a negligible burden on the search engines (111, 113, . . . , 115).

In one embodiment, the category searches are the most commonly searched categories in a search engine (e.g., 111), regardless of the city being searched. The category searches are the same for the different cities. The name searches include a subset of the most commonly requested name searches in a search engine (e.g., 111) and a random sampling of a percentage of the common name searches for each city. Alternate criteria can be used by the controller (101) to formulate the pre-determined set of search terms (141) for the evaluation of the performance (e.g., completeness, accuracy, etc.) of a search engine (e.g., 111).

In one embodiment, the controller (101) stores the data representing the listings in the search result pages generated by the search engines (e.g., 111, 113, . . . , 115). For example, the data representing the listings may include an indicator of the search engine that provided the result, the date and time of the search, the type of search (e.g., search by category or by name), a search term and city for the search, a count of business names provided in the search result, the business names and their addresses and phone numbers, etc.

In one embodiment, the controller (101) distributes the set of searches to a cloud of computers (e.g., 121, 123, . . . , 125) to minimize the ability of a search engine to recognize any specific pattern of the requests, which may affect the search results and/or cause the requests to be blocked. The cloud of computers (e.g., 121, 123, . . . , 125) may have different Internet Protocol (IP) addresses, which may be dynamic IP addresses or static IP addresses.

In one embodiment, the controller (101) re-randomizes the search terms (141) each month to obtain monthly results, even if the search terms (141) are not changed. Thus, the searches performed at the computers (e.g., 121, 123, . . . , 125) change from month to month for the generation of monthly scorecard.

Figure 2:
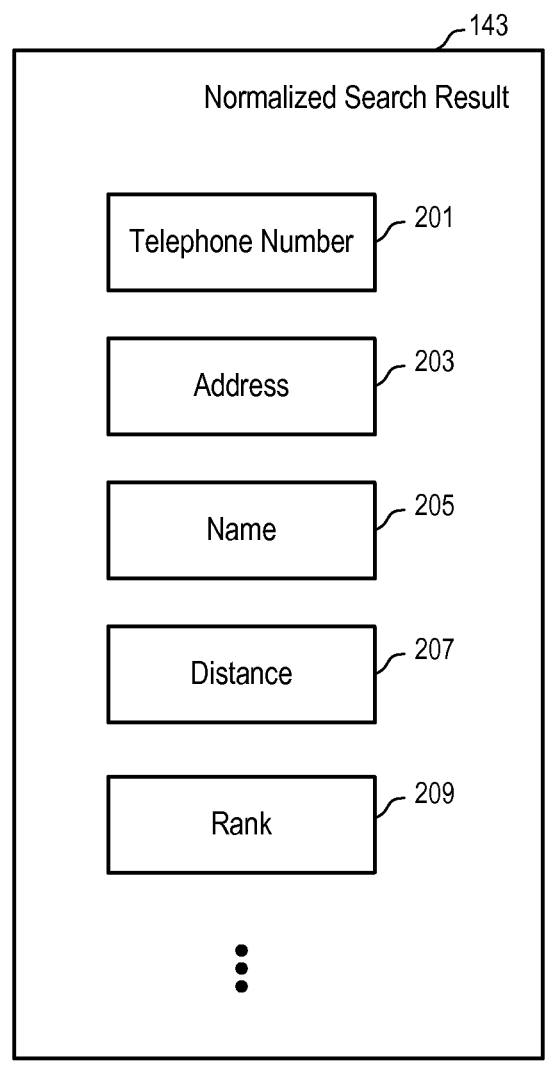
FIG. 2 shows a normalized search result, which can be used to establish a set of search results from a plurality of different search engines for the evaluation of search engine performance according to one embodiment.

FIG. 2 shows a normalized search result, for a local search which can be used to establish a set of search results from a plurality of different search engines for the evaluation of search engine performance according to one embodiment.

Typically, the search engines (111, 113, . . . , 115) may not provide results in the same format and may not provide the same set of data fields. For example, some search engines (131, 133, . . . , 135) may provide a distance to a location searched and others may not. In FIG. 2, a normalized search result (143) includes an aggregated set of data fields that are useful for subsequent analyses, such as telephone number (201), address (203), name (205), distance (207) from the business to a location searched, rank (209) of the business in the search result, etc. In some embodiments, the controller (101) may also collect the coordinates of the locations and evaluate the distance based on the coordinates (e.g., longitude and latitude).

To help identify the same or similar results, an address normalization process of the controller (101) normalizes the address (e.g., using the U.S. Postal Service (USPS) database of deliverable addresses).

In one embodiment, the controller (101) determines the accuracy of the listing based on at least the status of the telephone number (201). When the telephone number (201) is invalid or disconnected, comparisons performed by the controller (101) exclude the listing.

In one embodiment, the controller (101) classifies the listings in the result sets of the search engines (111, 113, . . . , 115) into categories such as invalid, duplicated, unique and valid. The controller (101) then aggregates the unique and valid results from all the search engines (111, 113, . . . , 115) to form a master set of unique and valid results. The controller (101) then compares the unique and valid results from the individual search engines (111, 113, . . . , 115) with the master set to determine indicators of completeness (e.g., as a percentage of the master set). The controller (101) can compute the result on a per search basis, on a search per city basis, on a search per region basis, etc.

Figure 3:
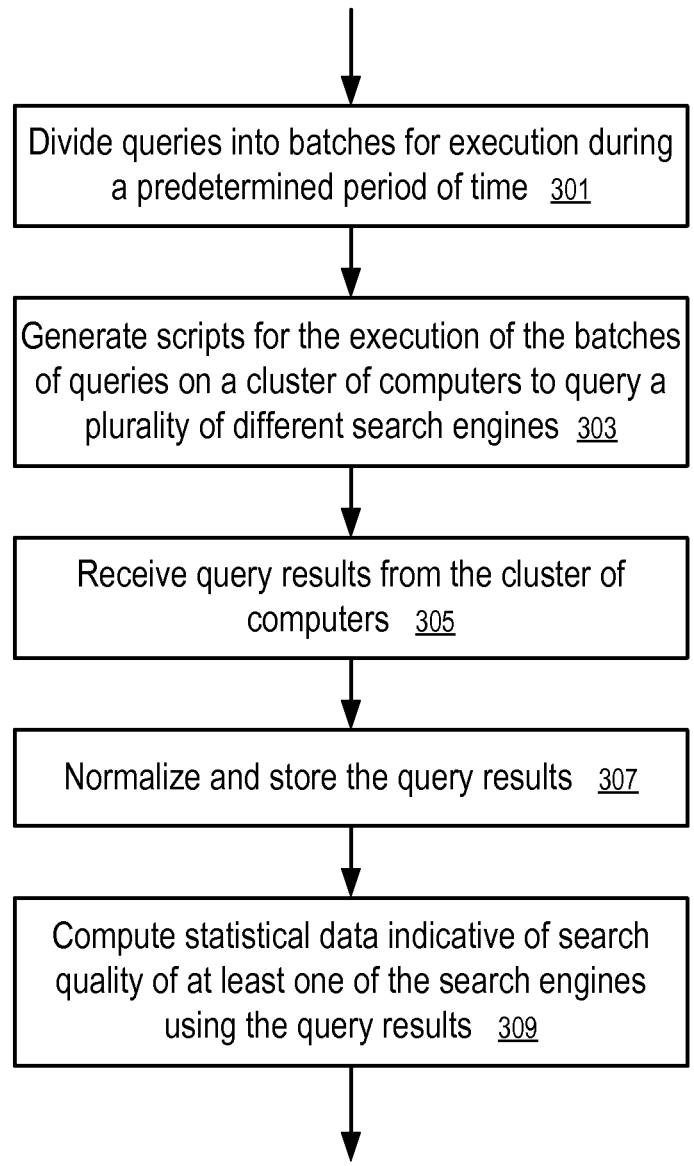
FIG. 3 shows a method to determine search quality according to one embodiment.

FIG. 3 shows a method to determine search quality according to one embodiment. In FIG. 3, the controller (101) divides (301) queries formulated based on the search terms (141) into batches for execution during a predetermined period of time and generates (303) scripts for the execution of the batches of queries on a cluster of computers (e.g., 121, 123, . . . , 125) to query a plurality of different search engines (111, 113, . . . , 115). After receiving (305) query results from the cluster of computers (e.g., 121, 123, . . . , 125), the controller (101) normalizes and stores (307) the query results. The controller (101) (or a different computer) then computes (309) statistical data indicative of the search quality of at least one of the search engines (111, 113, . . . , 115) using the query results.

Figure 4:
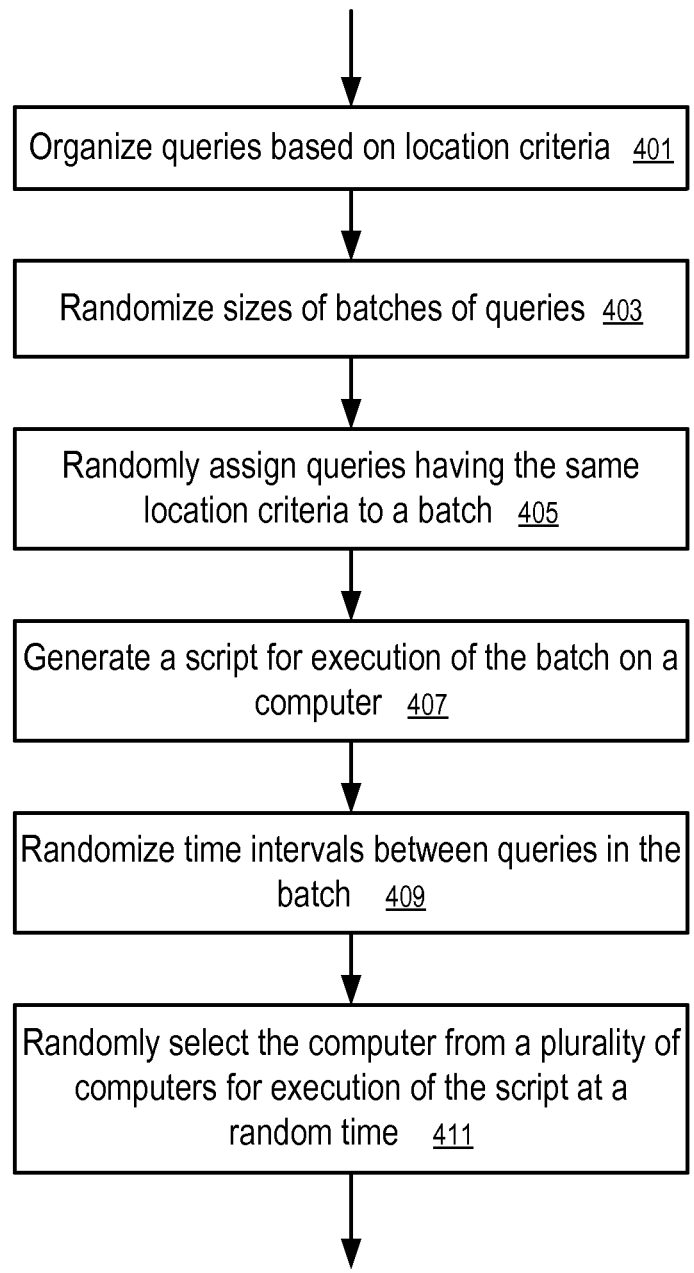
FIG. 4 shows a method to establish a set of search results according to one embodiment.

FIG. 4 shows a method to establish a set of search results according to one embodiment. In FIG. 4, the controller (101) organizes (401) queries based on location criteria and randomizes (403) sizes of batches of queries. The controller (101) randomly assigns (405) queries having the same location criteria to a batch to avoid mixing queries for different locations in the same batch. The controller (101) generates (407) a script for the execution of the batch on a computer (e.g., 121) and randomizes (409) time intervals between queries in the batch. The controller (101) randomly selects (411) the computer (e.g., 121) from a plurality of computers (e.g., 121, 123, . . . , 125) for execution of the script at a random time.

Figure 5:
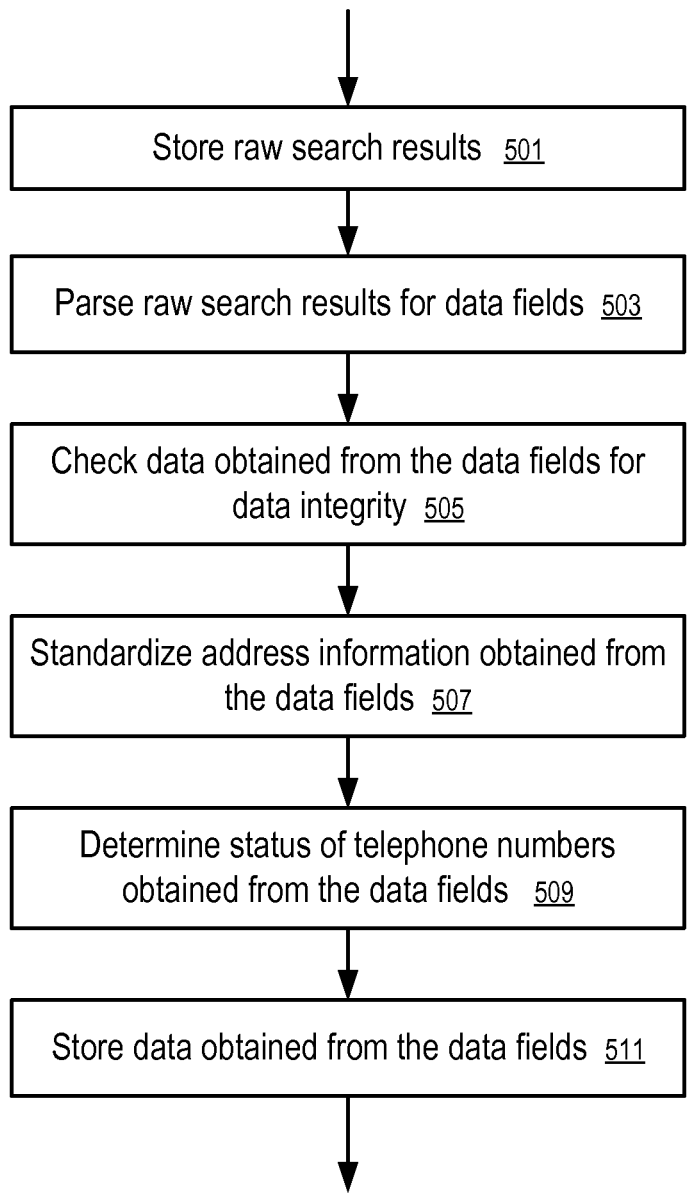
FIG. 5 shows a method to normalize search results according to one embodiment.

FIG. 5 shows a method to normalize search results according to one embodiment. In FIG. 5, the controller (101) stores (501) raw search results. The controller (101) parses (503) the raw search results for data fields. The controller (101) checks (505) data obtained from the data fields for data integrity and standardizes (507) address information obtained from the data fields. The controller (101) determines (509) the status of telephone numbers obtained from the data fields and stores (511) data obtained from the data fields.

For example, after the controller (101) determines a telephone number that is in a correct format, the controller (101) may check if the telephone number has a valid exchange number. If the telephone number does not have a valid exchange number that is currently in use, the telephone number is invalid.

For example, the data storage facility (105) may store a set of records that indicate the most recent time a set of telephone numbers have been used by end users via a telecommunication company, such as a long distance carrier, a cellular carrier, a local telephone company, etc. When the telephone number has been recently used in a successful telephone connection (e.g., within the last 30 days), the telephone number may be considered as a valid telephone number currently in service. When the data storage facility (105) does not have a record indicating a recent use of a telephone number, the controller (101) may cause the initiating of a routing message or signal that is designed to initiate a network ping to the telephone number. The use of the routing message or signal tests whether the telephone number is currently in service. If the telephone number is not currently in service, the controller (101) classifies the telephone number as being a disconnected telephone number.

In alternative embodiments, the controller (101) may use a script to instruct the computer (e.g., 121) to perform some of the tasks in processing the search results, such as parsing (503) for data fields, checking (505) for data integrity, standardizing (507) address information, and determining (509) the status of telephone numbers.

In one embodiment, the controller (101) monitors the data integrity by checking search result pages that do not provide listings, or provide insufficient listings (based on comparison with statistical data of past results, or statistical data search results from other search engines). Insufficient results may be an indication of a failure in extracting data in an automatic way (a failure in a web scraping module) or a change in behavior in the search engine (111, 113, . . . , 115). When the controller (101) detects such indications, the controller (101) may notify human operators to investigate the corresponding search results.

Figure 6:
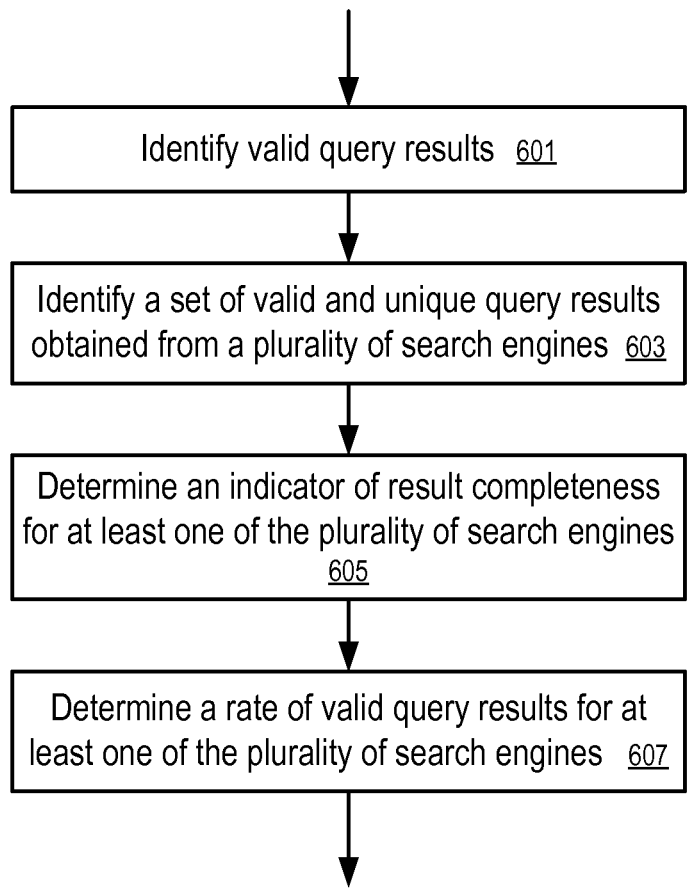
FIG. 6 shows a method to determine search quality indicators according to one embodiment.

FIG. 6 shows a method to determine search quality indicators according to one embodiment. In FIG. 6, the controller (101) identifies (601) valid query results (e.g., based on whether the telephone number is valid) and identifies (603) a set of valid and unique query results obtained from a plurality of search engines (e.g., 111, 113, . . . , 115). The controller (101) determines (605) an indicator of result completeness for at least one of the plurality of search engines (111, 113, . . . , 115) and determines (607) a rate of valid query results for at least one of the plurality of search engines (111, 113, . . . , 115).

Figure 7:
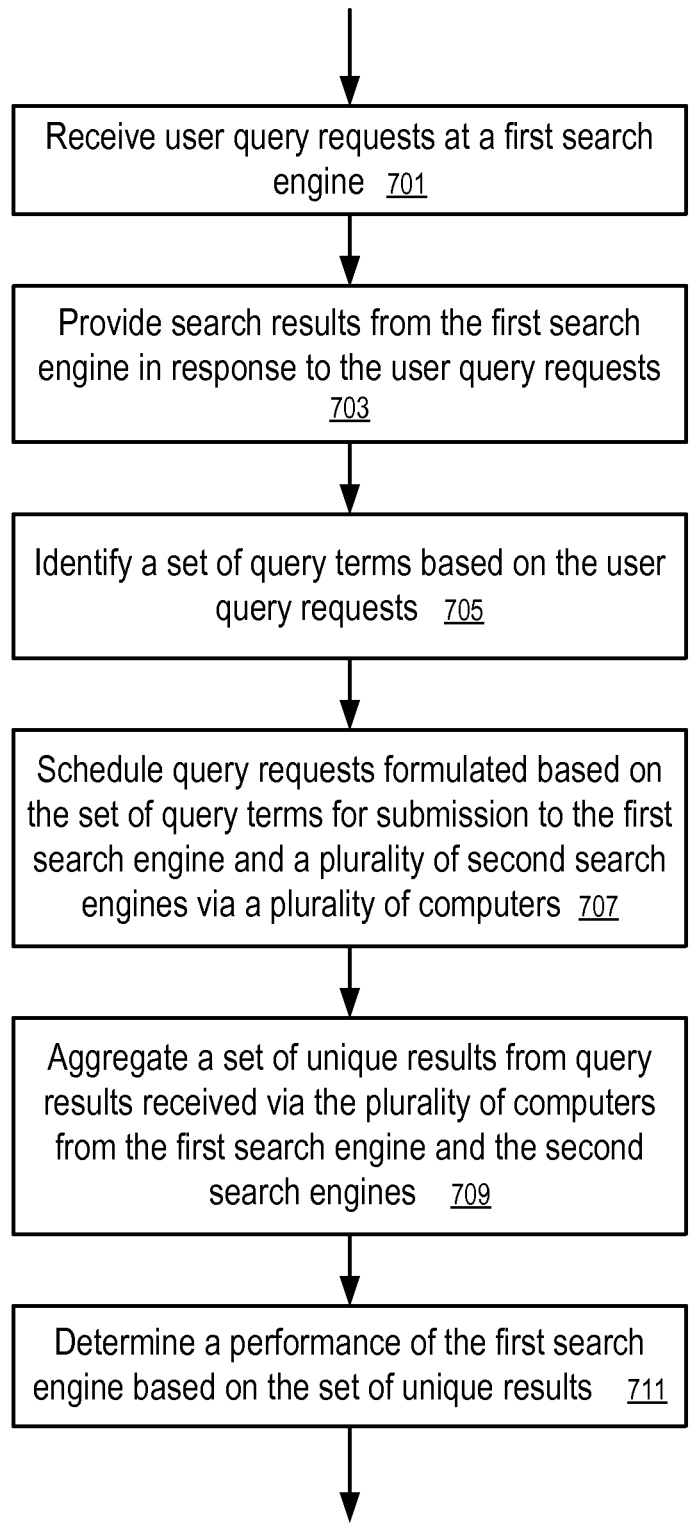
FIG. 7 shows a method to determine a search quality of one search engine according to one embodiment.

FIG. 7 shows a method to determine a search quality of one search engine according to one embodiment. In FIG. 7, a first search engine (e.g., 111) receives (701) user query requests (e.g., from user terminals 107) and provides (703) search results in response to the user query requests. The controller (101) (or another computer connected to the first search engine) identifies (705) a set of query terms based on the user query requests. The controller (101) then schedules (707) query requests formulated based on the set of query terms for submission to the first search engine (e.g., 111) and a plurality of second search engines (e.g., 113, . . . , 115) via a plurality of computers (e.g., 121, 123, . . . , 125). The controller (101) aggregates (709) a set of unique results from query results received via the plurality of computers (e.g., 121, 123, . . . , 125) from the first search engine (e.g., 111) and the second search engines (e.g., 113, . . . , 115). The controller (101) (or another computer connected to the data storage facility (105)) determines (711) a performance of the first search engine (e.g., 111) based on the set of unique results.

In one embodiment, the controller (101) performs quantitative analysis to determine the number of unique listings, duplicated listings, valid listings and/or invalid listings. The controller (101) counts the total number TOT_LIST of listings returned by a search engine (e.g., 111) for searches related to a city. The controller (101) classifies the TOT_LIST listings into NO_TN listings that do not have telephones numbers, DUPL_TN listings that the same telephone number as an earlier listing in the ordered set of local search results, INV_TN listings that have invalid telephone numbers and UNIQUE_TN listings that are earliest instances of their telephone number in an ordered listing and have not been previously classified. The controller (101) calculates the rate of listings that do not have telephone numbers, the rate of listings that have duplicated telephone numbers, the rate of listings that provide invalid telephone numbers, the rate of listings that provide disconnected telephone numbers, and the rate of other listings having unique telephone numbers, relative to the total number of listings returned by the search engine (e.g., 111), for searches in a city, in a region including a plurality of cities, or in a particular type of cities (e.g., large, small, medium, etc.). In some embodiments, the controller (101) calculates further statistics to characterize the results of a given search engine (e.g., 111, 113, . . . , or 115) by comparing its results to the results of the totality of the set of search engines (e.g., 111, 113, . . . , and 115). The results used may include the full set of results from each search engine (e.g., 111, 113, . . . , or 115), and in some embodiments the statistics are calculated using only relevant listing results, using one of the criteria for relevancy described above or some other relevancy criterion. For example, recall is the proportion of relevant listings returned by the given search engine (e.g., 111) relative to the total number of relevant listings returned by all search engines (e.g., 113, . . . , or 115) for the same query; precision is the proportion of relevant listings returned by the given search engine (e.g., 111) relative to the total number of listings returned by all search engines (e.g., 113, . . . , or 115) for the same query. The controller (101) may aggregate these values to the city and larger units for each search engine (e.g., 111, 113, . . . , or 115) at different consensus levels.

In one embodiment, when a search request provides no listings in the search result, the controller (101) excludes the search result from the calculation of search completeness for a set of searches (e.g., searches within a city, a region, or a type of cities, or a type of cities within a region).

In one embodiment, the controller (101) computes a completeness ratio for searches within a city, and computes an average of the completeness ratios for different cities as a completeness ratio for a collection of cities (e.g., a region, or a type of cities). In one embodiment, a completeness ratio is the fraction of all the (valid, non-duplicate) results aggregated across all search engines (111, 113, . . . , or 115) found by each individual search engine (111, 113, . . . , or 115). In some embodiments, the controller (101) may aggregate the data based on other criteria for characterization of the searches, such as aggregating based on the size of the cities of the searches. The controller (101) may aggregate the data based on combination of multiple criteria.

In some embodiments, the controller (101) also analyzes the time taken to respond to each of the queries from a specific search engine (111, 113, . . . , or 115) and uses the response time as part of quality metric for search engines (111, 113, . . . , or 115).

Figure 8:
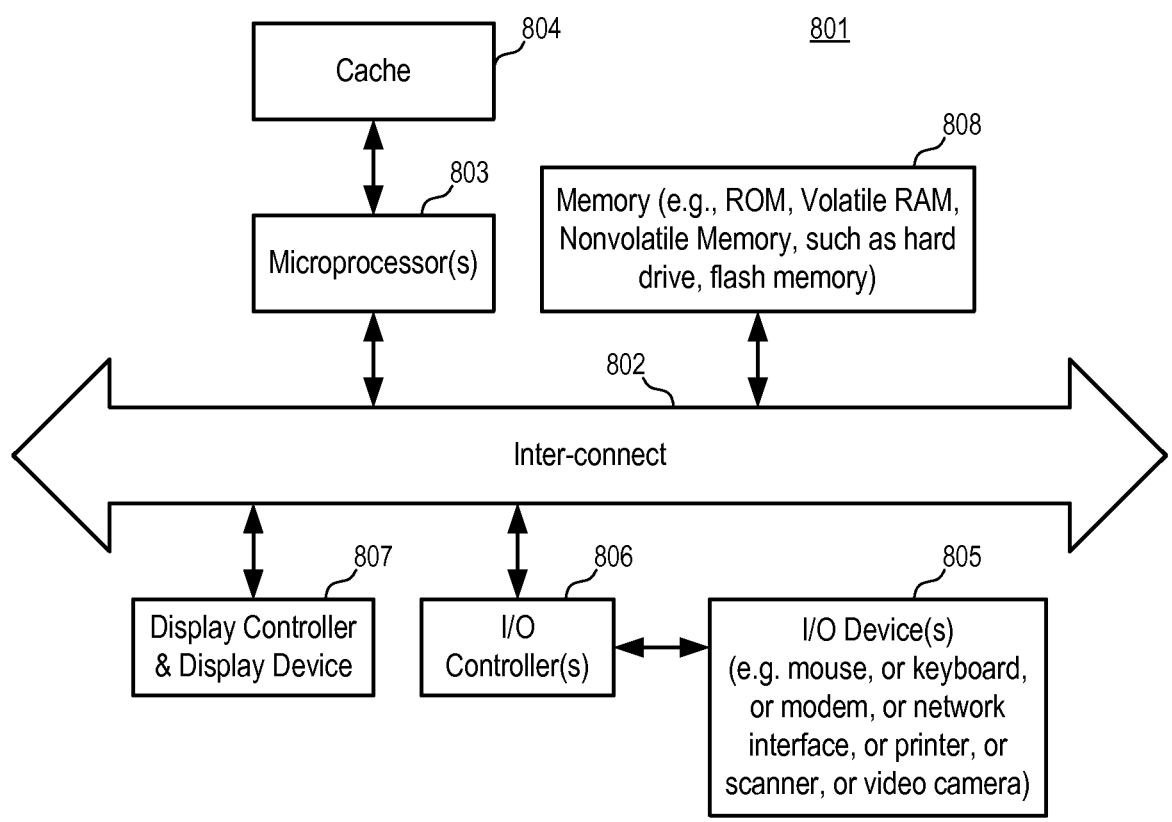
FIG. 8 shows a data processing system, which can be used in various embodiments.

FIG. 8 shows a data processing system, which can be used in various embodiments. While FIG. 8 illustrates various components of a computer system, it is not intended to represent any particular architecture or manner of interconnecting the components. Some embodiments may use other systems that have fewer or more components than those shown in FIG. 8.

In one embodiment, each of the computer controller (101), the data storage facility (105), computers (121, 123, . . . , 125), search engines (111, 113, . . . , 115) and user terminals (107) can be implemented as a data processing system illustrated in FIG. 8.

In FIG. 8, the data processing system (801) includes an inter-connect (802) (e.g., bus and system core logic), which interconnects a microprocessor(s) (803) and memory (808). The microprocessor (803) is coupled to cache memory (804) in the example of FIG. 8.

The inter-connect (802) interconnects the microprocessor(s) (803) and the memory (808) together and also interconnects them to a display controller and display device (807), and to peripheral devices such as input/output (I/O) devices (805) through an input/output (I/O) controller(s) (806).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (802) may include one or more buses connected to one another through various bridges, controllers and/or adapters. In one embodiment, the I/O controller (806) includes a USB (Universal Serial Bus) adapter for controlling USB peripherals, and/or an IEEE-1394 bus adapter for controlling IEEE-1394 peripherals.

The memory (808) may include ROM (Read Only Memory), volatile RAM (Random Access Memory), and non-volatile memory, such as hard drive, flash memory, etc.

Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data, which when executed by a data processing system, causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. The instructions may also be embodied in digital and analog communication links for electrical, optical, acoustical or other forms of propagated signals, such as carrier waves, infrared signals, digital signals, etc.

In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
scheduling, by a computer controller, submission of a batch of query requests to a first search engine and a plurality of second search engines, wherein the batch of query requests is submitted to the first search engine and the plurality of second search engines by a set of computers selected by the computer controller;
receiving, at the computer controller, first search results from the first search engine and second search results from the plurality of second search engines in response to submission of the batch of query requests to the first search engine and the plurality of second search engines;
aggregating, by the computer controller, the first search results received from the first search engine and the second search results received from the plurality of second search engines to form a set of aggregated unique search results, wherein aggregating the first search results received from the first search engine and the second search results received from the plurality of the second search engines to form the set of aggregated unique search results comprises eliminating an invalid result from the first search result received from the first search engine; and
comparing, via the computer controller, the first search results received from the first search engine to the set of aggregated unique search results to determine a performance of the first search engine, wherein the performance of the first search engine is based on a completeness of the first search results received from the first search engine in comparison with the set of aggregated unique search results.

2. The method of claim 1, wherein the set of aggregated unique search results includes at least a telephone number, and wherein the set of aggregated unique search results is identified based at least in part on the telephone number.

3. The method of claim 2, wherein the set of aggregated unique search results further includes one of an address and a name.

4. The method of claim 3, wherein the set of aggregated unique search results is further identified based at least in part on the one of the name and the address.

5. The method of claim 1, wherein eliminating the invalid result from the first search results received from the first search engine comprises, for each of the first search results received from the first search engine:
extracting respective data from a respective telephone number field of a search result of the first search results received from the first search engine, wherein the respective data comprises a telephone number;
determining whether the telephone number of the respective data is a valid telephone number; and
eliminating the search result if the telephone number of the respective data is not a valid telephone number.

6. The method of claim 5, wherein determining whether the telephone number of the respective data is a valid telephone number comprises determining whether the telephone number of the respective data has a proper exchange number.

7. The method of claim 5, wherein determining whether the telephone number of the respective data is a valid telephone number comprises determining a most recent date of the telephone number of the respective data being used for a call.

8. The method of claim 5, wherein determining whether the telephone number of the respective data is a valid telephone number comprises initiating a call routing signal to call the telephone number of the respective data to determine whether the telephone number of the respective data is in service.

9. The method of claim 5, further comprising determining a rate of invalid results for the first search engine based on identifying invalid telephone numbers in the first search results received from the first search engine.

10. The method of claim 1, further comprising:
receiving queries from end users at one of the plurality of second search engines; and
determining the batch of query requests based on the queries received from the end users.

11. The method of claim 1, wherein the batch of query requests relates to a predetermined geographic search criterion.

12. The method of claim 1, further comprising:
selecting, by the computer controller, the set of computers; and
providing, by the computer controller, the batch of query requests to the set of computers.

13. The method of claim 12, further comprising instructing, by the computer controller, the set of computers to submit a random number of the batch of query requests to the first search engine and the plurality of second search engines and to pause a random period of time between submitting the random number of the batch of query requests to the first search engine and the plurality of second search engines.

14. A computer-readable memory device storing instructions, the instructions, when executed by a computer controller, cause the computer controller to perform operations comprising:

scheduling submission of a batch of query requests to a first search engine and a plurality of second search engines, wherein the batch of query requests is submitted to the first search engine and the plurality of second search engines by a set of computers selected by the computer controller;

receiving first search results from the first search engine and second search results from the plurality of second search engines in response to submission of the batch of query requests to the first search engine and the plurality of second search engines;

aggregating the first search results received from the search engine and the second search results received from the plurality of the second search engines to form a set of aggregated unique search results, wherein aggregating the first search result received from the first search engine and the second search result received from the plurality of the second search engines to form the set if aggregated unique search results comprises eliminating an invalid result from the first search results received from the first search engine; and comparing the first search results received from the first search engine to the set of aggregated unique search results to determine a performance of the first search engine, wherein the performance of the first search engine is based on a completeness of the first search results received from the first search engine in comparison with the set of aggregated unique search results.

15. The computer-readable memory device of claim 14, wherein the operations further comprise:

selecting the set of computers; and providing the batch of query requests to the set of computers.

16. The computer-readable memory device of claim 15, wherein the operations further comprise instructing the set of computers to submit a random number of the batch of query requests to the first search engine and the plurality of second search engines and to pause a random period of time between submitting the random number of the batch of query requests to the first search engine and the plurality of second search engines.

17. A computer controller comprising:

a processor; and a memory storing instructions that, when executed by the processor, cause the processor to perform operations comprising scheduling submission of a batch of query requests to a first search engine and a plurality of second search engines, wherein the batch of query requests is submitted to the first search engine and the plurality of second search engines by a set of computers selected by the computer controller, receiving first search results from the first search engine and second search results from the plurality of second search engines in response to submission of the batch of query requests to the first search engine and the plurality of second search engines, aggregating the first search results received from the first search engine and the second search results received from the plurality of second search engines to form a set of aggregated unique search results, wherein aggregating the first search results received from the first search engine and the second search results received from the plurality of second search engines to form the set of aggregated unique search results comprises eliminating an invalid result from the first search results received from the first search engine, and comparing the first search results received from the first search engine to the set of aggregated unique search results to determine a performance of the first search engine, wherein the performance of the first search engine is based on a completeness of the first search results received from the first search engine in comparison with the set of aggregated unique search results.

18. The computer controller of claim 17, wherein the operations further comprise:

selecting the set of computers; and providing the batch of query requests to the set of computers.

19. The computer controller of claim 18, wherein the operations further comprise instructing the set of computers to submit a random number of the batch of query requests to the first search engine and the plurality of second search engines and to pause a random period of time between submitting the random number of the batch of query requests to the first search engine and the plurality of second search engines.

\* \* \* \* \*